Jan. 14, 1964 A. L. WACHAL 3,117,794
SHAFT GLANDS
Filed July 11, 1961
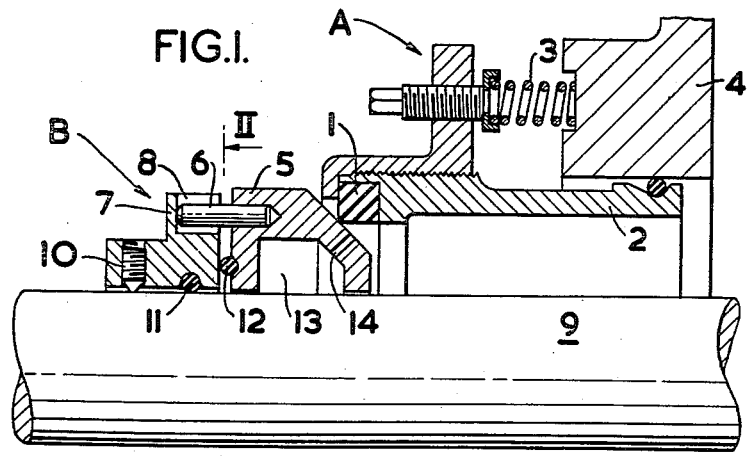
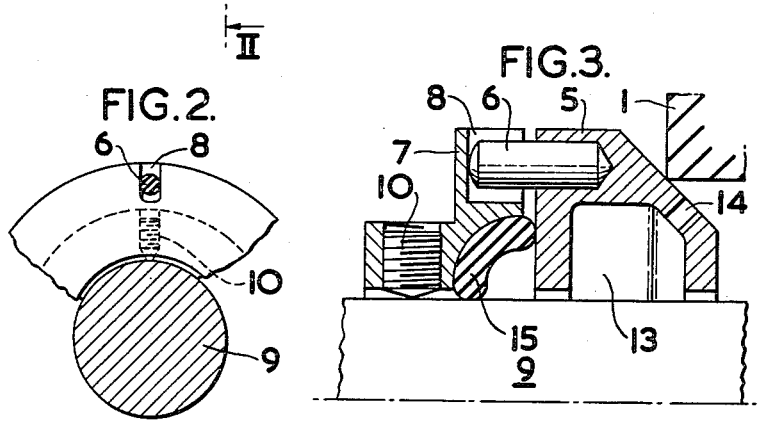
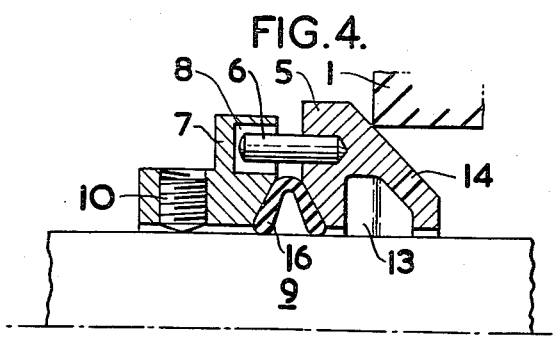
INVENTOR
ANTONI LESZEK WACHAL
BY
Morgan, Finnegan, Durham & Pine
ATTORNEYS

United States Patent Office 3,117,794
Patented Jan. 14, 1964

3,117,794
SHAFT GLANDS
Antoni Leszek Wachal, London, England, assignor to The British Petroleum Company Limited, London, England, a British joint-stock corporation
Filed July 11, 1961, Ser. No. 123,303
10 Claims. (Cl. 277—92)

This invention relates to an improved type of sealing gland for use with rotary shafts, for example the driving shaft of a high speed rotary pump.

Various types of shaft glands have previously been proposed. For example, in one common type of gland a member surrounds the shaft and is adjustable axially along the shaft. This member compresses a packing surrounding the shaft and housed in an annular space in the casing known as a stuffing box. Compression of the packing in the direction of the axis of the shaft causes radial expansion of the packing so that it forms a fluid-tight seal between the shaft and the internal wall of the stuffing box. This type of gland suffers from several disadvantages, for example, high friction causes wear of both packing and shaft, the gland needs frequent adjustments, it does not stop leakage completely, and the packing is not easily replaceable.

Another type of gland for rotary shafts proposed in British Patent No. 653,957 comprises a stuffing box surrounding the shaft, a sleeve slidably mounted on the shaft and projecting into the stuffing box, a tapered seating formed on the outer surface of that portion of the sleeve lying within the stuffing box, a flexible packing ring mounted on the sleeve adjacent to the seating so that a difference in pressure across the gland forces the packing ring into engagement with the internal wall of the stuffing box and the seating to effect a fluid-tight seal between the stuffing box and the sleeve, and a second packing ring fixed at one end of the sleeve, the sleeve being urged by the difference of fluid pressure across the gland in a direction causing the second packing ring to bear against a tapered seating formed on the shaft to effect a fluid-tight seal between the shaft and sleeve. This gland has the advantage that friction is greatly reduced, shaft wear is virtually eliminated and the packing rings are easily replaceable.

The present invention is concerned with an improved sealing gland of the type exemplified in British Patent No. 653,957, i.e. one in which a non-rotating sealing ring is held in contact with a tapered seating mounted on the shaft and rotating with it.

According to the present invention, a rotatable member suitable for use in a sealing gland of the type in which a non-rotatable packing ring is held in contact with a tapered surface formed on a sealing member mountable on and rotatable with a shaft comprises a locating ring fixable to a shaft and a sealing member connectable to the locating ring in such a manner that any eccentricity in the rotation of the shaft and/or locating ring is not transmitted to the sealing member.

Preferably the sealing member and locating ring are connectable by pins which can be fitted tightly into the sealing member and loosely into the locating ring so that the pins and sealing member have sufficient freedom of movement relative to the locating ring in a radial direction so that any eccentricity in the rotation of the shaft and/or locating ring is not transmitted to the sealing member.

The sealing member may be hollow and perforated to allow free circulation of fluid for cooling purposes.

Fluid-tight seals between the locating ring and the shaft and between the locating ring and the sealing member may be made in any convenient manner, for example by a single flexible insert contactable with the shaft, the locating ring and the sealing member or by separate packing rings insertable between the shaft and locating ring and between the locating ring and sealing member.

The invention includes a sealing gland comprising a stuffing box surrounding a shaft, a sleeve slidably mounted on the shaft and projecting into the stuffing box, a fluid-tight seal between the sleeve and the stuffing box, a packing ring fixed at one end of the sleeve, a rotatable member comprising a locating ring fixed onto the shaft and a sealing member having a tapered surface and connected to the locating ring in such a manner that any eccentricity in the rotation of the shaft and/or locating ring is not transmitted to the sealing member, the packing ring being urged to bear against the tapered surface of the sealing member.

The invention is described with particular reference to the accompanying drawings.

FIG. 1 is a section through the center of a gland along the axis of the shaft.

FIG. 2 is a side view of a locating ring taken along the line II—II in FIG. 1.

FIGS. 3 and 4 show alternative methods of sealing the rotatable member.

In FIG. 1, a sealing gland comprises a stationary member of the type proposed in British Patent No. 653,957 indicated generally at A in which packing ring 1 mounted on sleeve 2 is urged by springs 3 and fluid pressure to the right of sleeve 2 and stuffing box 4 into contact with a rotatable member according to the present invention generally indicated at B. The rotatable member comprises sealing member 5 connected by pins 6 to locating ring 7. Pins 6 are push-fitted into sealing member 5 and loosely fitted into gaps 8 in locating ring 7. Locating ring 7 is fixed to shaft 9 by grab screws 10. Packing rings 11 and 12 seal the rotating member axially and radially respectively. Hollow 13 and perforations 14 in sealing member 5 allow free circulation of fluid.

In FIG. 2, pins 6 are shown fitted into gaps 8 in locating ring 7.

When shaft 9 and therefore locating ring 7 rotate, sealing member 5 also rotates, being driven by pins 6. If, however, shaft 9 and/or locating ring 7 are slightly eccentric the resulting slight radial movement of the shaft and/or locating ring is not transmitted to the pins 6 and sealing member 5 as pins 6 are free to move relative to the locating ring in a radial direction within gaps 8. Thus, sealing member 5 rotates without eccentricity and the wear on sealing ring 1 is even.

FIG. 3 shows an alternative means of sealing the rotatable locating-sealing member B. A packing ring 15, curved in section, is fitted between the locating ring 7 and sealing member 5 so as to bear between its ends against the locating member and so as to bear, at one of its ends, against the shaft 9 and, at the other, against the sealing member, as shown, thereby sealing the rotatable locating-sealing member both axially and radially.

FIG. 4 shows yet another alternative means of sealing the rotatable locating-sealing member B. V-ring 16 is fitted between the locating ring 7 and sealing member 5 so as to bear, at its sides, against the locating ring 7 and sealing member 5 and so as to bear, at its ends, against the shaft 9, sealing the rotatable locating-sealing member both axially and radially.

I claim:

1. A rotatable locating-sealing member suitable for use in a sealing gland of the type in which a non-rotatable packing ring is held in contact with a tapered seating surface associated and rotatable with a shaft to be sealed, said member comprising a locating-ring for connection fixedly to the shaft, and a sealing member providing said tapered seating surface, said sealing member being loosely connected to said locating-ring for movement relative to said locating ring in a radial direction so that said sealing member is rotatable without eccentricity.

2. A rotatable member as claimed in claim 1 wherein the sealing member is provided with a number of pins fixedly connected thereto, and the locating-ring is provided with a number of radial gaps, said pins being loosely fitted into the locating-ring gaps so that the pins and sealing member have sufficient freedom of movement relative to the locating ring in a radial direction so that the sealing member is rotatable without eccentricity.

3. A rotatable member as claimed in claim 1 wherein the sealing member is hollow and perforated to allow free circulation of fluid.

4. A rotatable member as claimed in claim 1 wherein a fluid-tight seal is provided between the locating ring and the sealing member and comprises a single flexible insert for contact with the shaft, the locating ring and the sealing member.

5. A rotatable member as claimed in claim 1 wherein a fluid-tight seal is provided between the locating ring and the shaft and between the locating ring and the sealing member and comprises separate packing rings for insertion between the shaft and the locating ring and between the locating ring and the sealing member.

6. A sealing gland comprising a stuffing box, a shaft, a sleeve slidably mounted in the stuffing box and around said shaft, a fluid-tight seal between the sleeve and the stuffing box, a packing ring fixed at one end of the sleeve, and a rotatable locating-sealing member mounted on said shaft and comprising a locating ring surrounding and fixed on to the shaft, and an annular sealing member surrounding said shaft and having a tapered seating surface, the packing ring being urged to bear against the tapered surface of the sealing member, and said sealing member being loosely connected to said locating ring for movement relative to said locating ring in a radial direction so that the sealing member is rotatable without eccentricity.

7. A sealing gland as claimed in claim 6 wherein the sealing member is provided with a number of pins fixedly connected thereto, and the locating-ring is provided with a number of radial gaps, said pins being loosely fitted into the locating ring gaps, so that the pins and sealing member have sufficient freedom of movement relative to the locating ring in a radial direction so that the sealing member is rotatable without eccentricity.

8. A sealing gland as claimed in claim 6 wherein the sealing member is hollow and perforated to allow free circulation of fluid.

9. A sealing gland as claimed is claim 6 wherein a fluid-tight seal is provided between the locating ring and the sealing member and comprises a single flexible insert in contact with the shaft, the locating ring and the sealing member.

10. A sealing gland as claimed in claim 6 wherein a fluid-tight seal is provided between the locating ring and the shaft and between the locating ring and the sealing member and comprises separate packing rings inserted between the shaft and the locating ring and between the locating ring and the sealing member.

References Cited in the file of this patent
UNITED STATES PATENTS

| | | |
|---|---|---|
| 2,037,144 | Olson | Apr. 14, 1936 |
| 2,060,209 | Heckert | Nov. 10, 1936 |
| 2,742,306 | Kelso et al. | Apr. 17, 1956 |
| 2,857,031 | Fawick | Oct. 21, 1958 |